US009007506B2

(12) United States Patent
Miura

(10) Patent No.: US 9,007,506 B2
(45) Date of Patent: Apr. 14, 2015

(54) IMAGE PICKUP APPARATUS, CONTROL METHOD OF IMAGE PICKUP APPARATUS, PROGRAM, AND STORAGE MEDIUM

(71) Applicant: Canon Kabushiki Kaisha, Tokyo (JP)

(72) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/033,977

(22) Filed: Sep. 23, 2013

(65) Prior Publication Data

US 2014/0098255 A1 Apr. 10, 2014

(30) Foreign Application Priority Data

Oct. 4, 2012 (JP) .................................. 2012-222503

(51) Int. Cl.
*H04N 5/222* (2006.01)
*H04N 5/232* (2006.01)
*G06F 3/041* (2006.01)

(52) U.S. Cl.
CPC ........ *H04N 5/23248* (2013.01); *H04N 5/23216* (2013.01); *G06F 3/0416* (2013.01)

(58) Field of Classification Search
CPC ........... H04N 5/23248; H04N 5/23216; G06F 3/0416

USPC ........................................ 348/333.06, 333.11
See application file for complete search history.

(56) References Cited

U.S. PATENT DOCUMENTS

| 8,068,161 | B2 * | 11/2011 | Shibata et al. ............ 348/333.06 |
| 8,177,441 | B2 * | 5/2012 | Kuwahara et al. ............ 396/502 |
| 2011/0202859 | A1 * | 8/2011 | Fong .............................. 715/769 |
| 2013/0187882 | A1 * | 7/2013 | Kim .............................. 345/173 |
| 2013/0229377 | A1 * | 9/2013 | Fleizach et al. ................ 345/173 |

FOREIGN PATENT DOCUMENTS

| JP | 2001-177758 A | 6/2001 |
| JP | 2010-230871 A | 10/2010 |

* cited by examiner

*Primary Examiner* — Gevell Selby
(74) *Attorney, Agent, or Firm* — Cowan, Liebowitz & Latman, P.C.

(57) ABSTRACT

A image pickup apparatus includes a touch panel configured to detect a touch operation, an image pickup element arranged to pick up a moving image, and a system control unit configured to control to record the moving image picked up by the image pickup element and control to make the operation-receiving sensitivity of the touch panel for the touch operation in moving image recording higher than in a state other than the moving image recording.

46 Claims, 8 Drawing Sheets

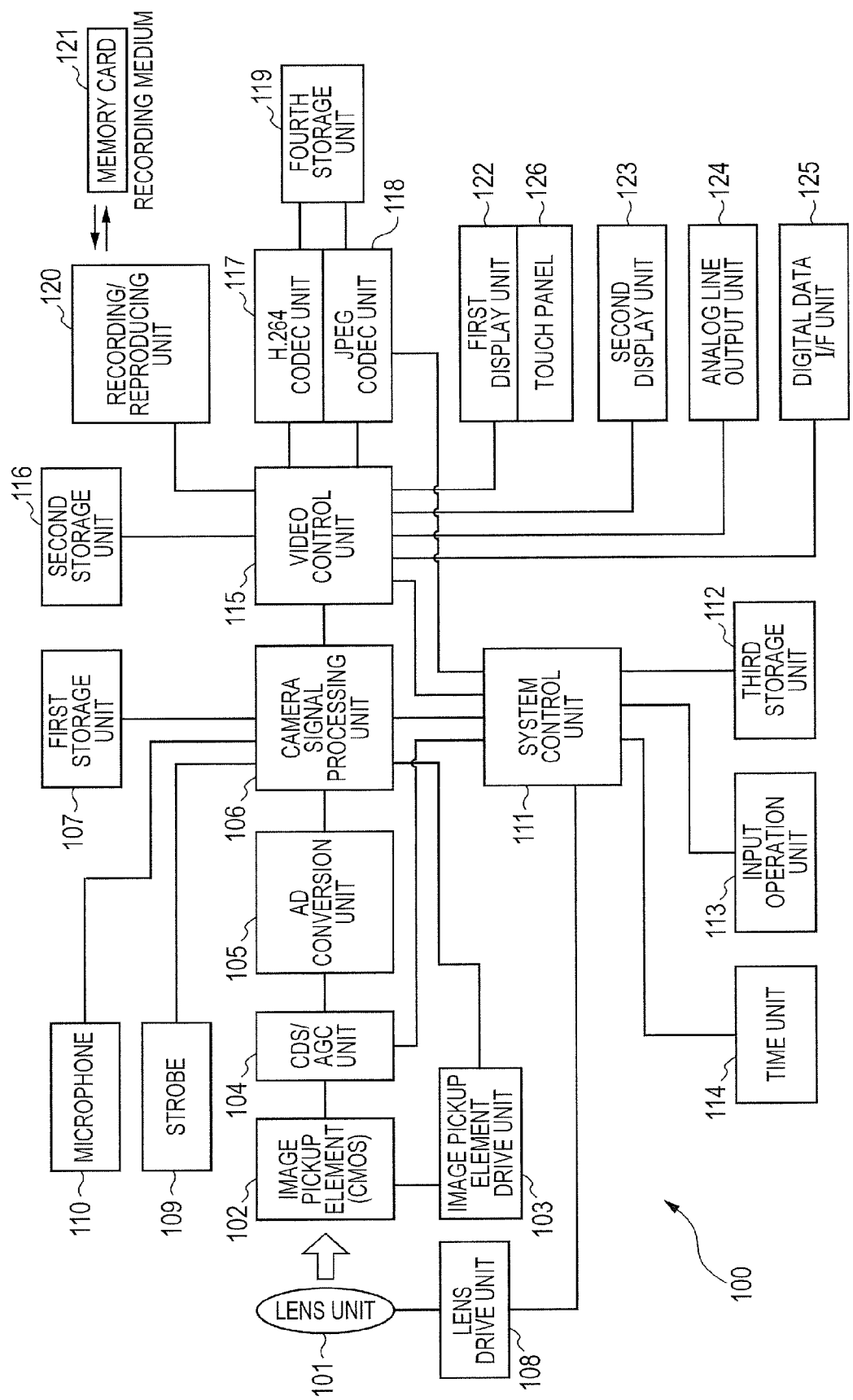

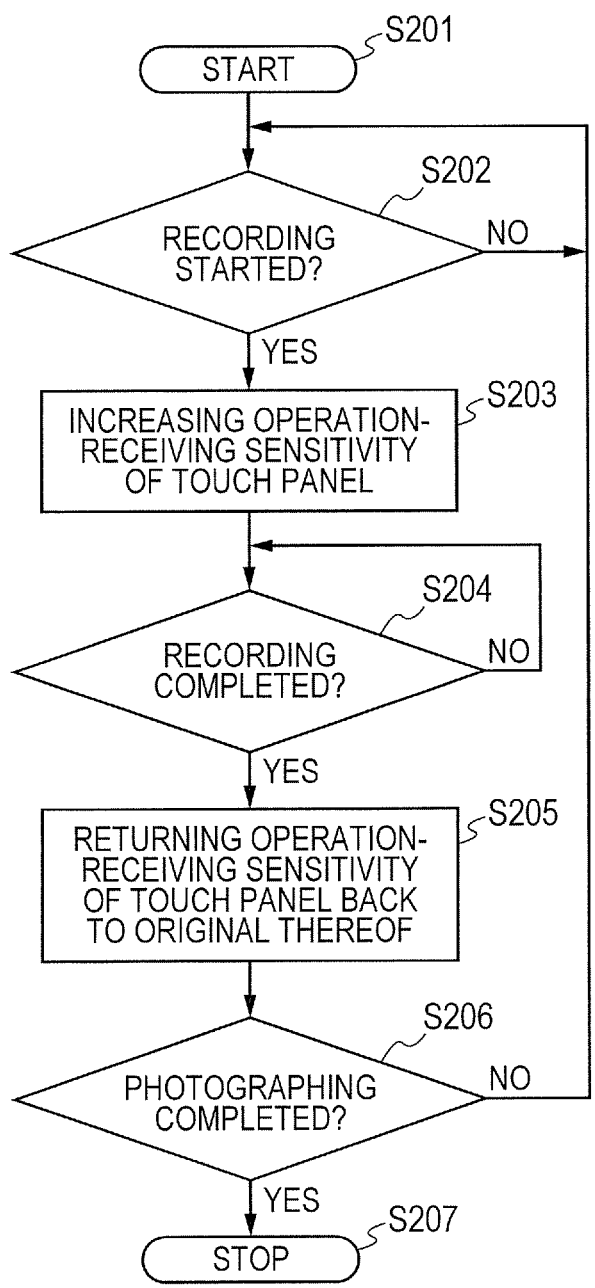

RECORDING STANDBY

IN RECORDING

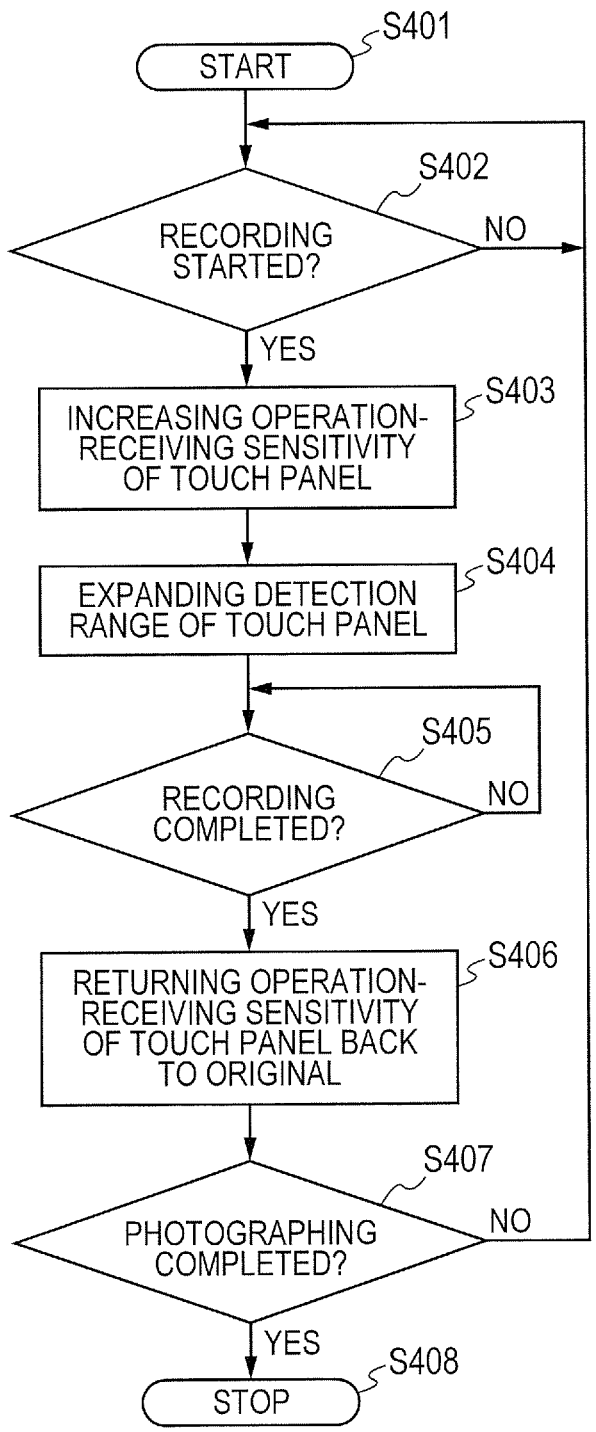

RECORDING STANDBY

DETECTION RANGE EXPANSION IN MOVING IMAGE RECORDING

FUNCTION ICON REDUCTION IN MOVING IMAGE RECORDING

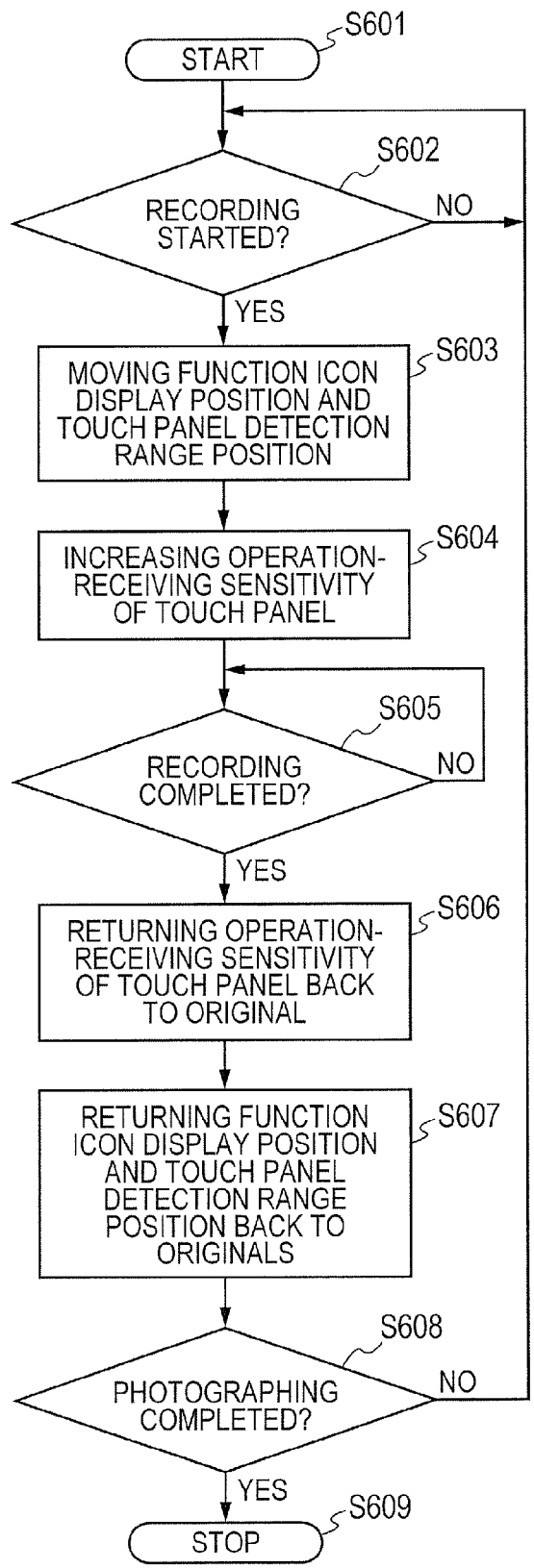

RECORDING STANDBY

IN RECORDING

IMAGE PICKUP APPARATUS, CONTROL METHOD OF IMAGE PICKUP APPARATUS, PROGRAM, AND STORAGE MEDIUM

BACKGROUND OF THE INVENTION

1. Field of the Invention

The present invention relates to an image pickup apparatus, a control method of the image pickup apparatus, a program, and a storage medium and, more particularly, to a touch panel control technique in the image pickup apparatus.

2. Description of the Related Art

A touch panel for an input operation is mounted on various portable equipments such as a portable telephone, a music player, a digital camera, and a digital video camera. The touch panel is advantageous because it enables an intuitive input operation by touching a visible portion, and it can flexibly cope with a variety of functions by switching the display content of a function to be operated in a limited display area.

For example, in a user's touch panel operation, a menu selection operation can be performed to set the functions of a portable equipment. In addition, the user can select one of images which is picked up by a digital camera and displayed as a plurality of thumbnail images, by directly touching it with a finger and display the selected image as a full-screen image. In this way, the touch panel allows the user to perform an easy operation using a fingertip or the like.

Japanese Patent Application Laid-Open No. 2001-177758 discloses an arrangement for designating, on a touch panel, a photometry position in a spot-photometry by a digital camera. Japanese Patent Application Laid-Open No. 2010-230871 discloses an arrangement for causing a user to touch a touch panel to select an object to be focused next from a plurality of faces recognized by a face recognition function in a digital camera.

Even during moving image photographing, the start/stop of photographing, designation of a focus position or a tracking target object, designation of a photometry position, a zoom operation, and the like are done by the touch panel operation. Today, counter-measurements of camera shaking have been improved along with the progress of a vibration-proof function in photographing of a digital camera or a digital video camera. However, there is still apprehension that the user's touch panel operation during moving image photographing causes camera shaking, and thus a blurred image is recorded.

SUMMARY OF THE INVENTION

The present invention has been made in consideration of the problem of the related art, and reduces the possibility of camera shaking caused by a touch panel operation during moving image photographing.

In order to solve the above-described problem, an image pickup apparatus having an input function using a touch panel according to the present invention comprises an image pickup unit arranged to pick up a moving image, a recording control unit configured to control to record the moving image picked up by the image pickup unit, a touch operation detection unit configured to detect a touch operation, and a control unit configured to control to increase an operation-receiving sensitivity of the touch operation detection unit in moving image recording by the image pickup unit and the recording control unit as compared to a state other than the moving image recording.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram showing an example of the arrangement of a high definition digital video camera according to an embodiment of the present invention.

FIG. 2 is a flowchart for explaining control of changing the operation-receiving sensitivity of a touch panel in photographing by the high definition digital video camera according to the first embodiment of the present invention which is an example of an image pickup apparatus.

FIG. 4 is a flowchart for explaining control of changing the operation-receiving sensitivity of a touch panel and the operation-receiving range of the touch panel in photographing by a high definition digital video camera according to the second embodiment of the present invention which is an example of an image pickup apparatus.

FIG. 6 is a flowchart for explaining control of changing the operation-receiving sensitivity of a touch panel, the display position of a function button, and the operation-receiving range of the touch panel in photographing by a high definition digital video camera according to the third embodiment of the present invention which is an example of an image pickup apparatus.

DESCRIPTION OF THE EMBODIMENTS

Figure 3A:
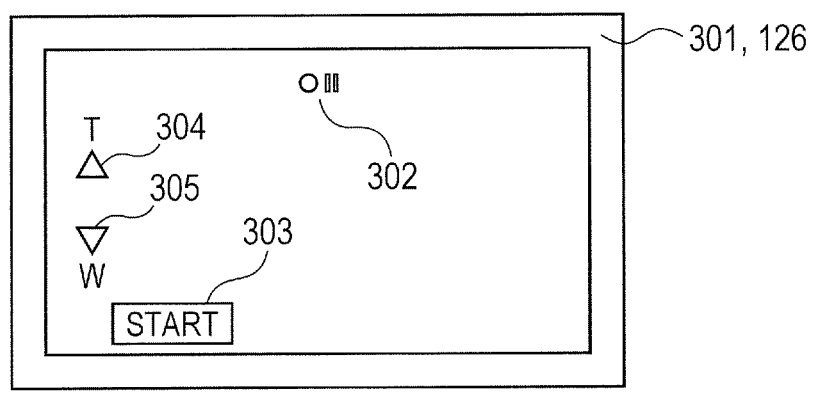
FIGS. 3A and 3B are views schematically showing a display screen that displays function buttons to be operated on a touch panel arranged on a liquid crystal display screen in photographing by the high definition digital video camera according to the first embodiment of the present invention which is an example of an image pickup apparatus.

Various exemplary embodiments, features, and aspects of the present invention will be described in detail below with reference to the drawings.

First Embodiment

As an example of an image pickup apparatus according to the first embodiment of the invention, a high definition digital video camera 100 (to be referred to as a "video camera" hereinafter) including a touch panel function and capable of photographing a moving image will be described. However, the present invention is applicable to an arbitrary image pickup apparatus having an input function with a touch operation. Examples of the apparatus are a digital (still) camera, a portable information terminal equipped with a camera, and a portable telephone equipped with a camera.

In the block diagram of FIG. 1, a lens unit 101 forms an optical system that forms an object image on the image pickup plane of an image pickup element 102, and has a zoom function, a focus adjustment function, and an iris adjustment function.

The image pickup element 102 has a structure in which a number of photoelectric conversion elements are two-dimensionally arranged, and converts an optical image of an object formed by the lens unit 101 into an analog image signal of a pixel basis. The image pickup element 102 can be, for example, a CMOS (Complementary Metal Oxide Semiconductor) image sensor or a CCD (Charged Coupled Device) image sensor. The image pickup element 102 also has an electronic shutter function by adjusting the charge accumulation time of the photoelectric conversion elements.

An image pickup element drive unit 103 drives the image pickup element 102 in accordance with a timing controlled by a camera signal processing unit 106.

A CDS/AGC unit 104 performs CDS (Correlated Double Sampling) of the analog image signal from the image pickup element 102 to reduce noise, and performs gain control (AGC) of the signal level under the control of a system control unit 111.

An A/D (Analog to Digital) conversion unit 105 converts the analog image signal from the CDS/AGC unit 104 into a digital image signal and supplies it to the camera signal processing unit 106.

The camera signal processing unit 106 controls the image pickup system of the camera by performing timing signal generation, AE (Auto Exposure) control, gamma adjustment, AF (Auto Focus) control, and the like in cooperation with the system control unit 111. For example, an "AF evaluation value" serving as the judgment criterion of an in-focus degree at the time of auto focusing is calculated by the camera signal processing unit 106. A face detection function in an image picked up is also performed by the camera signal processing unit 106. By feature detection processing for a face in an image, the camera signal processing unit 106 can calculate the position and region of the face of an individual object and present the system control unit 111 the region size and center coordinates representing the position of the face. The face detection method is not particularly limited, and a known method is usable.

The video camera 100 according to the present embodiment includes a first storage unit 107, a second storage unit 116, a third storage unit 112, and a fourth storage unit 119 corresponding to application purposes. For the descriptive convenience, assume that the first storage unit 107, the second storage unit 116, the third storage unit 112, and the fourth storage unit 119 are separately provided for camera signal processing, video control, system control, and a CODEC, respectively. However, the first storage unit 107, the second storage unit 116, the third storage unit 112, and the fourth storage unit 119 may be implemented by common hardware. Typically, the first storage unit 107, the second storage unit 116, the third storage unit 112, and the fourth storage unit 119 are formed from a readable/writable semiconductor memory. However, at least one of the memories may be formed from a storage device of another type.

The first storage unit 107 is used by the camera signal processing unit 106 as a frame memory and the like when performing signal processing of an image picked up.

A lens drive unit 108 drives the motor, actuator, and the like (none are shown) of the lens unit 101 under the control of the system control unit 111, thereby adjusting the zoom ratio, focus, and exposure.

The lens drive unit 108 is controlled by the system control unit 111 based on the signal processing result of the camera signal processing unit 106. For example, at the time of AF control, the system control unit 111 controls the lens drive unit 108 based on the AF evaluation value calculated by the camera signal processing unit 106 to drive the focus adjustment lens of the lens unit 101. The lens unit 101 is thus focused on the object.

A strobe 109 is used as a supporting source of light at the time of a still-image photographing as needed or in accordance with the photographer's setting.

A microphone 110 is enabled when recording ambient sound. A sound signal from the microphone 110 is supplied to the camera signal processing unit 106. For example, when recording sound from the microphone 110 together with an image picked up by the image pickup element 102, the camera signal processing unit 106 supplies the signals to a video control unit 115 while adjusting their time bases.

The system control unit 111 includes, for example, a CPU, and executes programs stored in the third storage unit 112 to control the overall operation of the video camera 100 according to the present embodiment, including control of a touch panel 126 to be described later.

The third storage unit 112 includes, for example, a ROM or a RAM and stores programs to be executed by the system control unit 111, various kinds of settings, and initial values. The third storage unit 112 also serves as the work area of the system control unit 111.

An input operation unit 113 is a user interface used by the photographer to provide the video camera 100 an instruction, and includes input devices such as keys and various kinds of operation buttons. As one of the input operation units 113, the video camera includes the touch panel 126 capable of sensing a touch on a first display unit 122. The touch panel 126 and the first display unit 122 can be integrated. For example, the touch panel 126 is configured to have such a light transmittance that does not impede display of the first display unit 122 and attached to the upper layer of the display surface of the first display unit 122. Input coordinates on the touch panel 126 are associated with display coordinates on the first display unit 122. This makes it possible to form a GUI as if the user could directly operate the screen displayed on the first display unit 122.

The system control unit 111 can detect a touch operation on the touch panel 126. More specifically, the system control unit 111 can detect the following touch operations: touching the touch panel 126 with a finger or pen (to be referred to as a "touch-down" hereinafter); a state in which the touch panel 126 remains being touched with a finger or pen (to be referred to as a "touch-on" hereinafter); moving a finger or pen keeping touched the touch panel 126 (to be referred to as a "touch-move" hereinafter); releasing a finger or pen from the touch panel 126 (to be referred to as a "touch-up" hereinafter); and a state in which nothing touches the touch panel 126 (to be referred to as a "touch-off" hereinafter).

These operations and position coordinates at which the finger or pen touches the touch panel 126 are sent to the system control unit 111 via an internal bus. The system control unit 111 determines, based on the received information, what kind of operation has been done on the touch panel 126.

As for move, the moving direction of the finger or pen that moves on the touch panel 126 can also be determined for each of the vertical component and the horizontal component on the touch panel 126 based on a change in the position coordinates.

When a touch-up occurs from a touch down via a predetermined move on the touch panel 126, it is considered that a stroke is drawn. An operation of quickly drawing a stroke will be called a flick. The flick is an operation of quickly moving a finger touched the touch panel 126 by a certain distance and directly releasing it. In other words, the flick is an operation of quickly tracing the surface of the touch panel 126 like flipping. Upon detecting a move for a predetermined distance or more at a predetermined speed or more and then detecting a touch up, the system control unit 111 can determine that a flick has been performed.

Upon detecting a move for a predetermined distance or more at not more than a predetermined speed, the system control unit 111 determines that a drag has been performed.

The touch panel 126 can use any one of various types such as a resistance film type, an electric capacity type, a surface acoustic wave type, an infrared-ray type, an electromagnetic induction type, an image recognition type, and a photo-sensor type.

The touch panel 126 used here can use various types such as an electric capacity type, a photo-sensor type, and a resistance film type. In the electric capacity type touch panel or photo-sensor type touch panel, the operation stress is small (or almost unnecessary). On the other hand, in the resistance film type touch panel, the operation stress is large as compared to the electric capacity type touch panel.

In particular, the resistance film type touch panel detects a touch based on a voltage generated by a touch pressure, and this readily causes camera shaking by the operation stress. Even the electric capacity type touch panel or the like in which the operation stress is small in theory may limit the operation-receiving sensitivity by filter processing or the like from the viewpoint of preventing an input error caused by noise. For this reason, even a touch panel in which the operation stress is small may cause camera shaking by the operation stress.

A time unit 114 includes an RTC (Real Time Clock) and a backup battery, and returns date/time information in response to a request from the system control unit 111.

The video control unit 115 performs display control including adjustment of hue, chroma, and luminosity for the first display unit 122 and a second display unit 123, output control of an analog line output unit 124, output control of a digital data I/F unit 125, control of a recording/reproducing unit 120, and the like. The video control unit 115 also performs resolution conversion of an image signal for each image output system including the first display unit 122 and the second display unit 123, generation and superimposition of a zebra pattern or a peaking signal, edge component extraction from a picked-up image, and waveform generation, and the like. The video control unit 115 also performs OSD (On Screen Display) display control of photographing information, user setting menu, and function button display necessary for the touch panel operation.

The second storage unit 116 is a storage unit for video control and is used by the video control unit 115 as a frame memory, a work memory, or the like when performing signal processing associated with a video baseband signal.

An H.264 codec unit 117 is an example of a moving image codec for performing a coding/decoding process of a moving image. As the coding/decoding method, various known methods such as MPEG (Moving Picture Experts Group)-2 can be used. Similarly, a JPEG (Joint Photographic Experts Group) codec unit 118 is an example of a still image codec for performing a coding/decoding process of a still image. As the coding/decoding method, various known methods such as JPEG2000 and PNG can be used.

Note that in the present embodiment, to share the circuit of the H.264 codec unit 117 and implement a still image photographing function (capture function) from a reproduced moving image, the JPEG codec unit 118 is connected to the video control unit 115. However, the JPEG codec unit 118 may directly be connected to the camera signal processing unit 106. The fourth storage unit 119 is a storage unit for CODEC and is used by the H.264 codec unit 117 and the JPEG codec unit 118 when coding/decoding an image signal.

The recording/reproducing unit 120 records recording data in a recording medium 121 or reads out data from it. The recording data is coded by the video control unit 115 and the H.264 codec unit 117 or the JPEG codec unit 118 and processed as a recording format. Note that the recording medium 121 is not limited to a memory card, and a DVD, an optical disk having a larger capacity, a recording/reproducing system may be also formed even for an HDD, or the like.

The first display unit 122 and the second display unit 123 are display devices, and both can display the same information. In the present embodiment, however, the second display unit 123 is smaller than the first display unit 122, and is provided in the viewfinder of the video camera 100. On the other hand, the first display unit 122 is a relatively large display device provided on, for example, a side surface of the case to be opened/closed by a hinge mechanism or the like.

In an image pickup mode, the first display unit 122 and the second display unit 123 performat auxiliary display such as focus frame display in addition to display of an input image or enlarged image from the image pickup element 102. Each of the first display unit 122 and the second display unit 123 functions as an EVF (Electronic View Finder) by sequentially displaying input images from the image pickup element 102.

On the other hand, in a reproduction mode, the first display unit 122 and the second display unit 123 display a moving image or a still image recorded in the recording medium 121. They can also display input operation information by the photographer from the input operation unit 113 or arbitrary image information (photographing information) in the memory card of the recording medium 121.

The analog line output unit 124 is an interface group for analog component image output, S terminal output, composite image output, and the like. When the analog line output unit 124 is connected to an external monitor or the like, an image output from the digital video camera can be displayed on the external monitor.

The digital data I/F unit 125 can include at least one digital interface such as USB I/F, IEEE1394 I/F, or HDMI.

Figure 3B:
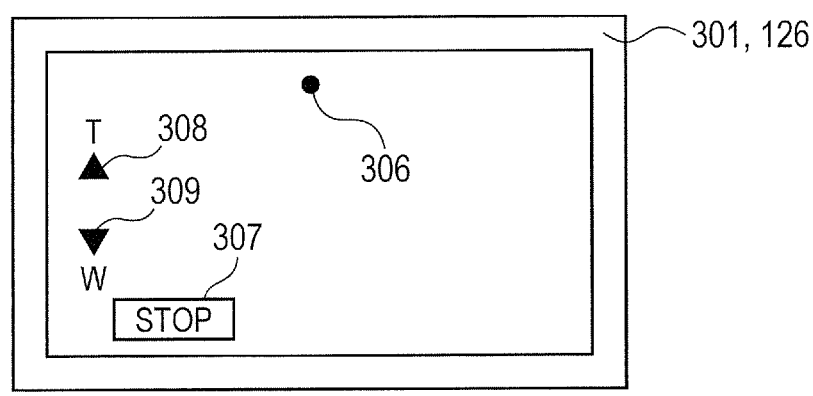

Touch panel control in moving image recording and that in a state other than the moving image recording, during the photographing mode of the video camera 100 according to the present embodiment, will be described next with reference to FIGS. 2, 3A, and 3B. Operations other than moving image recording will be referred to as "Rec pause". FIG. 2 is a flowchart showing processing of controlling the touch panel 126. FIGS. 3A and 3B are views schematically showing the operation screen of the touch panel 126 in the processing shown in FIG. 2. A program to execute the processing shown in the flowchart is stored in the ROM of the third storage unit 112 in advance. The CPU of the system control unit 111 shown in FIG. 1 reads out the program from the ROM and extracts and executes the program on the RAM of the third storage unit 112, thereby implementing the processing shown in FIG. 2. When the program is executed, each functional block is controlled. Note that the first display unit 122 and/or the second display unit 123 sequentially displays so-called through images (also called EVF images). The first display unit 122 functions as an EVF for displaying the object, various kinds of function buttons of the touch panel function, and photographing information.

Step S201 indicates the start, and the video camera 100 transits to the photographing mode as an operation mode. Mode change is done by the user by operating a mode dial or a mode change button (neither are shown) included in the input operation unit 113. The system control unit 111 executes the steps (steps S201 to S207). FIGS. 3A and 3B are views schematically showing a display screen that displays OSD and display items such as function buttons to be operated on the touch panel 126 arranged on a liquid crystal display panel 301 serving as the first display unit 122 in photographing by the video camera 100. Note that FIG. 3A shows an example of display of Rec pause (recording standby), and FIG. 3B shows an example of display in recording.

In step S202, the system control unit 111 determines the start of recording. In a case where the user presses a Rec pause button (not shown) included in the input operation unit 113 or touches a START icon 303 shown in FIG. 3A, the system control unit 111 determines that recording starts. Upon determining that recording has started, the system control unit 111 starts moving image recording as recording control. The START icon 303 is a display item to receive a photographing start instruction. The process advances to step S203. The system control unit 111 changes the display of the first display unit 122 and the second display unit 123 from an OSD state 302 representing the Rec pause state in FIG. 3A to a display state 306 representing that Rec is being progressed (recording of an image picked up is progressing) in FIG. 3B. The user is thus notified of the start of recording. On the other hand, before the user presses the Rec pause button, the system control unit 111 only displays the image on the first display unit 122 and/or the second display unit 123 and does not perform recording.

In step S203, the system control unit 111 increases the operation-receiving sensitivity of the touch panel 126. Icons 304 and 305 in FIG. 3A or icons 308 and 309 in FIG. 3B are icons (first display items) functioning as zoom function buttons. When the user touches the icon 304 or 308, the lens drive unit 108 changes the angle of photographing view to a telephoto side under the control of the system control unit 111. On the other hand, when the user touches the icon 305 or 309, the lens drive unit 108 changes the angle of photographing view to a wide angle side under the control of the system control unit 111. If the user continues touching one of these icons, the lens drive unit 108 continuously changes the angle of photographing view to the telephoto side or wide angle side under the control of the system control unit 111. The system control unit 111 makes the operation-receiving sensitivity of the touch panel 126 for the icons 308 and 309 in the moving image recording state shown in FIG. 3B higher compared with that for the icons 304 and 305 in the Rec pause state shown in FIG. 3A. That is, the system control unit 111 increases the operation-receiving sensitivity for the first display items.

Control of increasing the operation-receiving sensitivity will be described here.

In a case where the touch panel 126 is of resistance film type, the system control unit 111 provides a threshold for the contact resistance value, and controls to judge the presence of an operation upon detecting that a touch pressure more than a predetermined contact resistance value. To increase the operation-receiving sensitivity, the system control unit 111 then relaxes the threshold (lowers the contact resistance value) in a direction to receive the operation (in a direction in which the accuracy lowers due to noise). The output voltage of the touch panel 126 of resistance film type changes in accordance with the touch pressure. For this reason, the system control unit 111 determines whether the output voltage of the touch panel 126 is equal to or higher than a criterion (to be referred to as a detection criterion TH hereinafter) to judge the presence of a touch, and detects a touch in a case where the output voltage of the touch panel 126 is equal to or higher than the detection criterion TH. The system control unit 111 increases the operation-receiving sensitivity by lowering the detection criterion TH. This makes it possible to receive the touch operation even by a low touch pressure. As details of the control, on/off-control of a noise reduction filter, unstable input state elimination by contact resistance observation, and the like are performed.

If the touch panel 126 is of electric capacity type, the sensitivity can be increased by adjusting the threshold of the electric capacity. In a case where the sensitivity is increased, the touch panel 126 can receive a touch operation even if the finger is located farther away from the detection electrode than before increasing the sensitivity. That is, depending on the adjustment of the capacity threshold, the user can perform the touch operation by placing the finger close to the touch panel 126 without directly touching the touch panel 126 (or display screen). This can reduce the possibility of camera shaking.

When the operation-receiving sensitivity of the zoom function icons 308 and 309 is increased, the system control unit 111 notifies the user of it by changing the display format of the display items. As a method for this, the system control unit 111 here changes the display color of the zoom function icons 308 and 309, as shown in FIG. 3B. Note that the change of the display color is merely an example of the change of the display format, and the present invention is not limited to this. It is essential only that the display items are displayed in a display format such that the user can know the increase of the operation-receiving sensitivity.

On the other hand, the operation-receiving sensitivity of a STOP icon 307 shown in FIG. 3B, which receives a moving image recording stop instruction contrary to the START icon 303 shown in FIG. 3A, can be increased similarly or kept unchanged by control. Note that the display item whose sensitivity is not changed will be defined as a second display item. However, in a case where the operation-receiving sensitivity of the STOP icon 307 that is the second display item is increased, moving image recording is readily completed by a slight operation, and the user may erroneously stop moving image recording. Hence, the system control unit 111 prohibits the operation-receiving sensitivity of the STOP icon 307 from increasing (handles the STOP icon as the second display item whose operation-receiving sensitivity is not changed), thereby preventing an erroneous moving image recording stop operation. Moving image recording stop is an operation that is performed only once in one cut (from the start to the completion of moving image recording), unlike the zoom operation that can be performed repetitively. For this reason, camera shaking caused by operating the STOP icon 307 never occurs repetitively in one cut even if the sensitivity of the STOP icon 307 is not increased. That is, affection of camera shaking caused by operating the STOP icon 307 is little, even if it occurs.

Note that in a case where the operation-receiving sensitivity of the STOP icon 307 is increased, the system control unit 111 can notify the user of the increase of the operation-receiving sensitivity by changing the display color of the STOP icon 307, like the zoom function icons 308 and 309. In this way, the function icons to increase the operation-receiving sensitivity may arbitrarily be controlled in the same screen as needed.

In step S204, the system control unit 111 determines the completion of recording. When the user presses the Rec pause button included in the input operation unit 113 again or presses the STOP icon 307 shown in FIG. 3B, the system control unit 111 completes the moving image recording and advances to step S205.

In step S205, the system control unit 111 returns the operation-receiving sensitivity of the touch panel 126 back to the original state. In addition, the system control unit 111 returns the display format (in the present embodiment, the changed display color) of the function icons 304 and 305 to the original display format back from that of the function icons 308 and 309 for the increased operation-receiving sensitivity.

In step S206, the system control unit 111 determines the completion of photographing. When the user selects the mode dial or mode button included in the input operation unit 113, the system control unit 111 determines that the user inputs a photographing stop instruction, and completes the photographing mode. Note that in a case where the user operates the mode dial or mode button at an arbitrary timing during the control of this procedure, the system control unit 111 interrupts the processing at that point of time, returns the process state to the initial state, and shifts to the designated mode.

Step S207 indicates the completion of control, and the system control unit 111 completes the photographing mode.

As described above, according to the present embodiment, the operation-receiving sensitivity of the touch panel 126 in moving image recording is increased to reduce the action stress required for the operation of the touch panel 126. This can reduce the blur of an image picked up caused by the user operation on the touch panel 126.

Second Embodiment

The second embodiment of the present invention will be described next. A video camera 100 according to the present embodiment is the same as in the first embodiment except that the operation-receiving range of a touch panel 126 is also changed. Hence, a repetitive description will be omitted, and different points will mainly be explained.

When the operation-receiving sensitivity of the touch panel 126 is increased, the input accuracy (the accuracy of matching between the input coordinates and the position touched by the user) lowers, and the user can hardly accurately touch (designate) an intended position. In the second embodiment, when the operation-receiving sensitivity of the touch panel 126 is increased, the operation-receiving range is expanded to compensate for the decrease of the input accuracy. This arrangement is mainly different from the first embodiment. Note that even when the input accuracy does not change, expanding the operation-receiving range is useful from the viewpoint of facilitating the user's input operation.

Figure 5A:
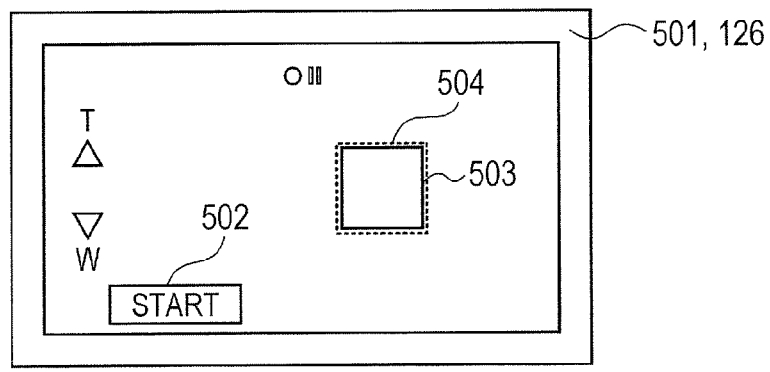
FIGS. 5A, 5B, and 5C are views schematically showing a display screen that displays function buttons to be operated on a touch panel arranged on a liquid crystal display screen in photographing by the high definition digital video camera according to the second embodiment of the present invention which is an example of an image pickup apparatus.
Figure 5B:
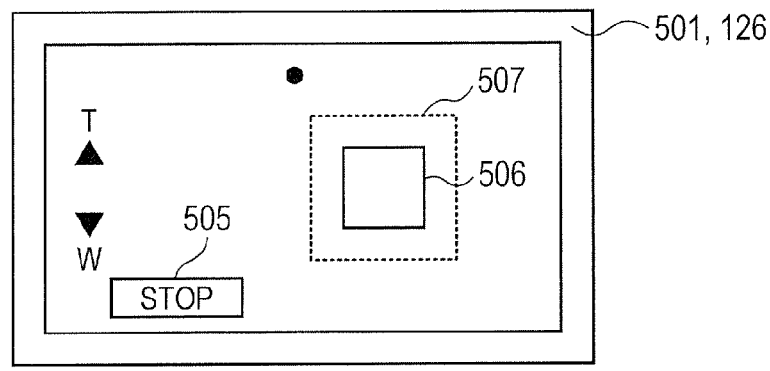
Figure 5C:
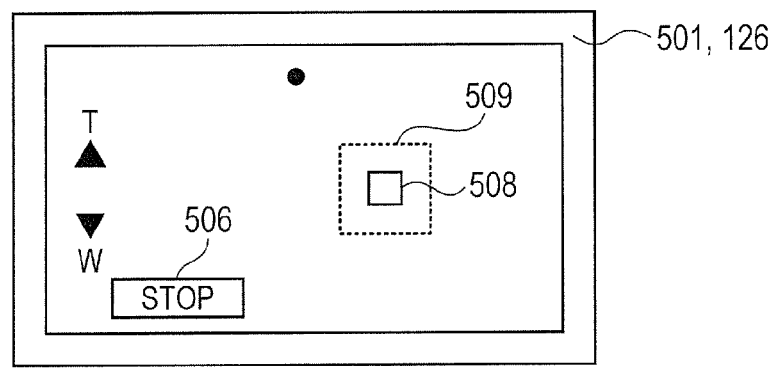

Touch panel control in moving image recording and in a state other than the moving image recording, during the photographing mode of the video camera 100, will be described with reference to FIGS. 4 and 5A to 5C, as in the first embodiment. FIG. 4 is a flowchart showing processing of touch panel control. FIGS. 5A to 5C are views schematically showing a display screen that displays OSD and display items as function icons to be operated on the touch panel 126 arranged on a liquid crystal display panel 501 serving as a first display unit 122 in photographing by the video camera 100. A program to execute the processing shown in the flowchart is stored in the ROM of a third storage unit 112 in advance. (The CPU of) a system control unit 111 shown in FIG. 1 reads out the program and loads and executes the program on the RAM of the third storage unit 112. Each functional block is thus controlled by the system control unit 111, and the processing shown in this flowchart is implemented. Note that the first display unit 122 and/or a second display unit 123 sequentially displays so-called through images (also called EVF images). The first display unit 122 functions as an EVF for displaying the object, function buttons of the touch panel function, and photographing information.

Step S401 indicates the start, and the video camera 100 transits to the photographing mode as an operation mode. Mode change is done by the user by operating a mode dial or a mode change button (neither are shown) included in an input operation unit 113. The system control unit 111 executes the steps (steps S401 to S408).

In step S402, the system control unit 111 determines the start of recording. When the user presses a Rec pause button (not shown) included in the input operation unit 113 or touches a START icon 502 shown in FIG. 5A, the system control unit 111 starts recording an image and advances to step S403. On the other hand, before the user presses the Rec pause button, the system control unit 111 only displays the image on the first display unit 122 and/or the second display unit 123 and does not perform recording.

In step S403, the system control unit 111 increases the operation-receiving sensitivity of the touch panel 126. An icon 503 in FIG. 5A, an icon 506 in FIG. 5B, and an icon 508 in FIG. 5C represent arbitrary icons, for example, face detection frame displays. The system control unit 111 makes the operation-receiving sensitivity of the touch panel 126 for the function icon 506 in the moving image recording state shown in FIG. 5B higher compared with that for the function icon 503 shown in FIG. 5A. Control of increasing the operation-receiving sensitivity is the same as described in the first embodiment. More specifically, the control is done in the following way. For example, conventionally, to prevent a detection error and ensure the input accuracy, a threshold is provided, and control is done to judge based on the contact resistance value upon pressing the touch panel of the metal resistance film type whether an operation has been performed. In this control, the system control unit 111 relaxes the threshold in a direction to receive the operation (in a direction in which the accuracy lowers).

In step S404, the system control unit 111 expands the operation-receiving range of the touch panel 126. More specifically, the system control unit 111 makes an operation-receiving range 507 for the function icon 506 shown in FIG. 5B wider compared with an operation-receiving range 504 for the function icon 503 shown in FIG. 5A. This makes it possible to implement detection of the operation corresponding to the function icon even if the accuracy of the input position lowers upon increasing the operation-receiving sensitivity in step S403.

In step S405, the system control unit 111 determines the completion of recording. When the user presses the Rec pause button included in the input operation unit 113 again or touches a STOP icon 505 shown in FIG. 5B, the system control unit 111 completes the moving image recording and advances to step S406.

In step S406, the system control unit 111 returns the operation-receiving sensitivity of the touch panel 126 back to the original state.

In step S407, the system control unit 111 determines the completion of photographing. When the user selects the mode dial or mode button included in the input operation unit 113, the system control unit 111 completes the photographing mode. Note that if the user operates the mode dial or mode button at an arbitrary timing during the control of this procedure, the system control unit 111 interrupts the processing at that point of time, returns the process state to the initial state, and shifts to the designated mode.

Step S408 indicates the completion of control, and the system control unit 111 completes the photographing mode.

In the processing shown in the flowchart of FIG. 4, the system control unit 111 expands the operation-receiving range for the function icon 506, as shown in FIG. 5B. However, the system control unit 111 may make the size (display range) of the function icon 508 smaller relative to the operation-receiving range, as shown in FIG. 5C. In a case where the display range of the icon 508 is made smaller, the operation-receiving range can be made large relative to the accuracy of the user's pressing the icon 508. It is therefore possible to avoid an input error or an undetected error even when the operation-receiving sensitivity is increased.

FIGS. 5A to 5C show an arrangement that enlarges the operation-receiving ranges 504, 507, and 509 for the function icons 503, 506, and 508 as a central similar figure. However, the symmetry and shape of the enlarged area are not necessarily limited to those described here. For example, control may be done such that the distance between the contour of the function icon and the contour of the operation-receiving range may change between the longitudinal direction and the widthwise direction of the touch panel of metal resistance film type. This enables control according to the gap direction characteristic when the operation-receiving sensitivity is increased so that the input accuracy deteriorates. Note that the gap direction characteristic in a case where the input accuracy deteriorates depends on the time constant of the contact resistance and the electric capacity and a sampling point by the A/D converted of the touch panel controller.

As described above, in the second embodiment, when the operation-receiving sensitivity of touch panel 126 is increased, one of control (1) and control (2) is performed together: (1) control to make the operation-receiving ranges 504, 507, and 509 large relative to the display ranges of the function icons 503, 506, and 508; and (2) control to make the display ranges of the function icons 503, 506, and 508 small relative to the operation-receiving ranges 504, 507, and 509. This makes it possible to not only obtain the effect of the first embodiment but also prevent an input error or an undetected error caused by the deterioration of the input accuracy as a side effect upon increasing the operation-receiving sensitivity of the touch panel 126. It is therefore possible to reduce the action stress of the touch panel operation and reduce the blur of an image picked up caused by the user's touch panel operation.

Third Embodiment

The third embodiment of the present invention will be described next. A video camera 100 according to the present embodiment is the same as in the first embodiment except that the display position of a function icon and the operation-receiving range of a touch panel 126 corresponding to the function icon are changed. Hence, a repetitive description will be omitted, and different points will mainly be explained.

The present embodiment is largely different from the first embodiment in that at the same time as increasing the operation-receiving sensitivity of the touch panel 126, the position of a function icon and the position of an operation-receiving range corresponding to the function icon on the screen are changed.

Figure 7A:
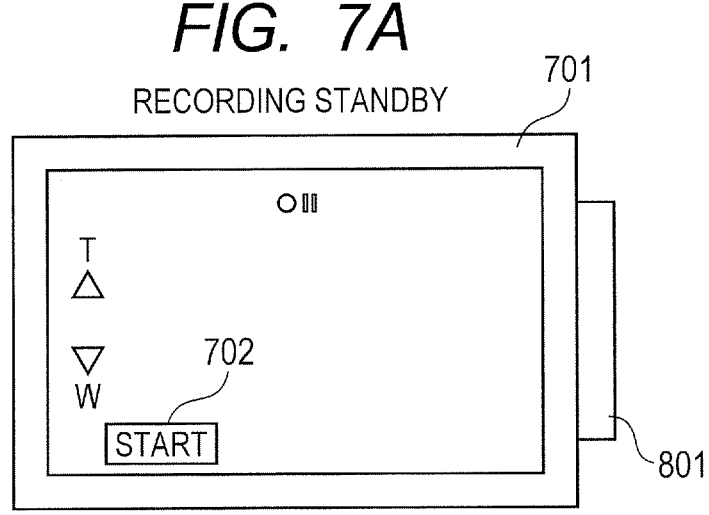
FIGS. 7A and 7B are views schematically showing a display screen that displays function buttons to be operated on a touch panel arranged on a liquid crystal display screen in photographing by the high definition digital video camera according to the third embodiment of the present invention which is an example of an image pickup apparatus.
Figure 7B:
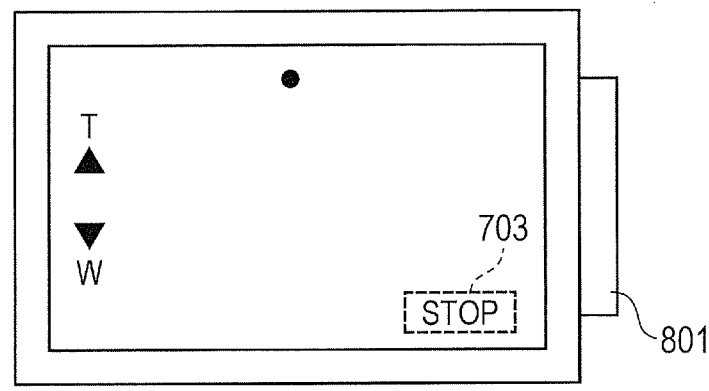

Touch panel control in moving image recording and in a state other than the moving image recording, during the photographing mode of the video camera 100, will be described with reference to FIGS. 6, 7A, and 7B, as in the first embodiment. FIG. 6 is a flowchart showing processing of touch panel control. FIGS. 7A and 7B are views schematically showing a display screen that displays OSD and display items such as function buttons to be operated on the touch panel 126 arranged on a liquid crystal display panel 701 serving as a first display unit 122 in photographing by the video camera 100 as an example.

A program to execute the processing shown in the flowchart is stored in the ROM of a third storage unit 112 in advance. A system control unit 111 shown in FIG. 1 reads out the program and extracts and executes the program on the RAM of the third storage unit 112. The system control unit 111 controls each functional block in accordance with the computer program. The processing shown in FIG. 6 is thus implemented.

Figure 8:
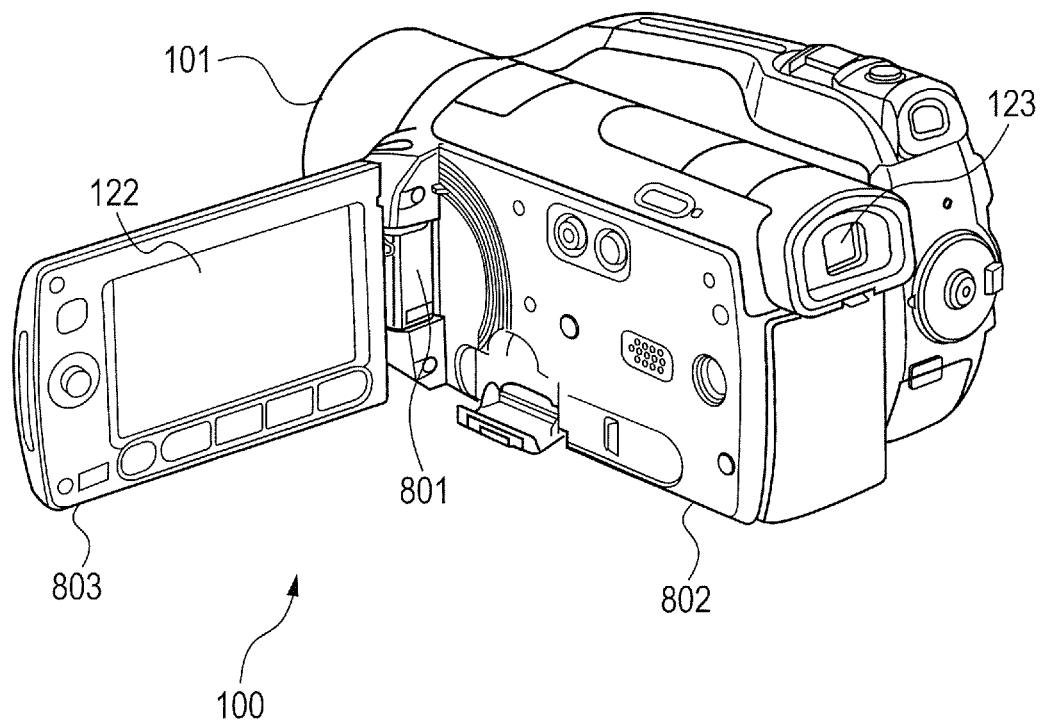
FIG. 8 is a perspective view schematically showing the arrangement of the high definition digital camera according to the third embodiment of the present invention which is an example of an image pickup apparatus.

Note that the first display unit 122 and/or a second display unit 123 sequentially displays so-called through images (also called EVF images). The first display unit 122 functions as an EVF for displaying the object, function icons of the touch panel function, and photographing information. FIG. 8 is a perspective view schematically showing the arrangement of the video camera 100 according to the third embodiment. As shown in FIG. 8, the first display unit 122 is provided on a variable angle monitor unit 803. Note that the variable angle monitor unit 803 is connected to a main body unit 802 via a connection unit 801 (hinge unit) to be able to open/close or rotate. The main body unit 802 is provided with a lens unit 101, an image pickup element 102, and a grip portion.

Step S601 indicates the start, and the video camera 100 transits to the photographing mode as an operation mode. Mode change is done by the user by operating a mode dial or a mode change button (neither are shown) included in an input operation unit 113. The system control unit 111 executes the steps (steps S601 to S609).

In step S602, the system control unit 111 determines the start of recording. When the user presses a Rec pause button (not shown) included in the input operation unit 113 or a START icon 702 shown in FIG. 7A, the system control unit 111 starts recording and advances to step S603. On the other hand, before the user presses the Rec pause button, the system control unit 111 only displays the image on the first display unit 122 and/or the second display unit 123 and does not perform recording.

In step S603, the system control unit 111 performs moving processing to move the display position of a STOP icon 703 as shown in FIG. 7B relative to the display position of the START icon 702 as shown in FIG. 7A. That is, when the START icon 702 is displayed on a side opposite to the connection unit 801, the system control unit 111 performs moving processing to move the STOP icon 703 used to stop photographing to a side close to the connection unit 801. Note that this depends on the structure of the video camera 100. In this case, when the image pickup optical system is located on the right side of the panel (the side of the connection unit 801), the operation unit is moved close to the image pickup unit on the right side (the side of the connection unit 801), thereby reducing the torque applied to the connection unit 801 at the time of operation of the touch panel 126. This arrangement can suppress rotational blurring in a direction substantially perpendicular to an optical axis. This yields the effect of suppressing the blur of a recorded moving image together with the control of increasing the operation-receiving sensitivity. Note that this control is effective when the variable angle monitor unit 803 is open. This control is unnecessary when the variable angle monitor unit 803 is closed with respect to the main body unit 802, that is, when the display surface or back surface of the first display unit 122 faces the main body unit 802. Hence, the system control unit 111 may change the display position of the STOP icon 703 in synchronism with the start of moving image recording in a case where the variable angle monitor unit 803 is open with respect to the main body unit 802, and prohibit the change in a case where the variable angle monitor unit 803 is closed. A case in which the variable angle monitor unit 803 is open indicates a case in which the display surface of the first display unit 122 faces the photographer side and/or faces the object side. Note that not only the STOP icon 703 but any display item to receive the touch operation can undergo the moving processing of moving the display position to the side of the connection unit 801 in synchronism with the start of recording.

In step S604, the system control unit 111 increases the operation-receiving sensitivity of the touch panel 126. The targets to increase the sensitivity are the START icon 702 in FIG. 7A that receives the moving image recording start instruction, and the STOP icon 703 in FIG. 7B that receives the moving image recording stop instruction. In the moving image recording state, the system control unit 111 makes the operation-receiving sensitivity of the touch panel 126 for the STOP icon 703 in FIG. 7B higher compared with that for the START icon 702 in FIG. 7A.

In step S605, the system control unit 111 determines the completion of recording. When the user presses the Rec pause button included in the input operation unit 113 again or touches the STOP icon 703 shown in FIG. 7B, the system control unit 111 completes the moving image recording and advances to step S606.

In step S606, the system control unit 111 returns the operation-receiving sensitivity of the touch panel 126 back to the original state.

In step S607, the system control unit 111 returns the function icon moved in step S603 back to the original position.

In step S608, the system control unit 111 determines the completion of photographing. When the user selects the mode dial or mode button included in the input operation unit 113, the system control unit 111 completes the photographing mode. Note that if the user operates the mode dial or mode button at an arbitrary timing during the control of this procedure, the system control unit 111 interrupts the processing at that point of time, returns the process state to the initial state, and shifts to the designated mode.

Step S609 indicates the completion of control, and the system control unit 111 completes the photographing mode.

As described above, in the present embodiment, when the operation-receiving sensitivity of the touch panel is increased, the display position of a function icon is simultaneously changed in consideration of the arrangement of the image pickup optical system or the operability of the user. This makes it possible to not only obtain the effect of the first embodiment but also reduce the influence of the operation of the touch panel 126 on an image picked up. It is therefore possible to reduce the blur of a picked-up image caused by the user's operation on the touch panel 126.

The present invention has been described above in detail based on preferred embodiments. However, the present invention is not limited to these specific embodiments and also incorporates various forms without departing from the spirit and scope thereof. The above-described embodiments are merely examples of the present invention and can appropriately be combined.

For example, the recording medium to record an image need not always be located in the main body of the video camera. An image picked up may be transferred to an external recording apparatus by wired or wireless communication. In this case, the moving image recording state may indicate the state of the recording apparatus or a state of the recording/reproducing apparatus other than the reproduction state.

The touch panel can use any one of various types such as a resistance film type, an electric capacity type, a surface acoustic wave type, an infrared-ray type, an electromagnetic induction type, an image recognition type, and a photo-sensor type.

In the above-described embodiments, the control is switched between the moving image recording state and a state other than moving image recording. However, the control may be done depending on whether the touch panel operation influences a recorded moving image.

Note that the control of the system control unit can be done by one piece of hardware or a plurality of pieces of hardware sharing the processing to control the overall apparatus.

In the above-described embodiments, an example has been described in which the present invention is applied to a high definition digital video camera. However, the present invention is not limited to this example, and is applicable to an image pickup apparatus including a display unit or a device that has a function of picking up a moving image and includes a display unit for displaying the moving image picked up. That is, the present invention is applicable to a personal computer, a PDA, a portable telephone terminal, a portable image viewer, a printer apparatus including a display, a digital photo frame, a music player, a game machine, an electronic book reader, and the like.

Other Embodiments

The present invention is also implemented by executing the following processing. That is, software (program) for implementing the functions of the above-described embodiments is supplied to a system or apparatus via a network or various storage media, and the computer (or CPU or MPU) of the system or apparatus is caused to read out and execute the program codes. In this case, the program and the storage medium storing the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222503 filed on Oct. 4, 2012, which is hereby incorporated by reference herein in its entirety.

What is claimed is:
1. An image pickup apparatus comprising:
an image pickup unit arranged to pick up a moving image;
a recording control unit configured to control to record the moving image picked up by the image pickup unit;
a touch operation detection unit configured to detect a touch operation; and
a control unit configured to control to increase an operation-receiving sensitivity of the touch operation detection unit in moving image recording by the image pickup unit and the recording control unit as compared to in a state other than the moving image recording, wherein the control unit controls to increase the operation-receiving sensitivity of the touch operation detection unit in accordance with a start of the moving image recording by the image pickup unit and the recording control unit.

2. An apparatus according to claim 1, wherein the touch operation detection unit comprises a touch panel configured to detect the touch operation on a display unit, and
the apparatus further comprises a display control unit configured to control display of the display unit.

3. An apparatus according to claim 2, wherein the display control unit controls to display, on the display unit, a display item to receive the touch operation in different display formats before and after the control unit increases the operation-receiving sensitivity.

4. An apparatus according to claim 3, wherein the control unit controls to increase the operation-receiving sensitivity for, out of a first display item and a second display item displayed on the display unit to receive the touch operation during the moving image recording, the first display item and not to increase the operation-receiving sensitivity for the second display item.

5. An apparatus according to claim 4, wherein the second display item comprises a display item to receive a stop instruction of the moving image recording.

6. An apparatus according to claim 5, wherein the control unit increases the operation-receiving sensitivity of the touch operation detection unit, and widens an operation-receiving range of the first display item displayed on the display unit to receive the touch operation.

7. An apparatus according to claim 5, wherein the control unit increases the operation-receiving sensitivity of the touch operation detection unit, and narrows a display range of the first display item displayed on the display unit to receive the touch operation, without changing an operation-receiving range of the first display item.

8. An apparatus according to claim 2, wherein the display unit is provided on a variable angle monitor unit rotatably connected, via a connection unit, to a main body unit including the image pickup unit, and
the display control unit controls to perform, in accordance with the start of the moving image recording, moving processing of moving a display position of a display item displayed on the display unit to receive the touch operation to a side closer to the connection unit than before the start of the moving image recording.

9. An apparatus according to claim 8, wherein the display control unit performs the moving processing in a case where the variable angle monitor unit is open with respect to the main body unit, and does not perform the moving processing in a case where the variable angle monitor unit is closed with respect to the main body unit.

10. An apparatus according to claim 1, wherein the touch operation detection unit is a touch operation detection unit of a resistance film type, and
the control unit lowers a threshold of a voltage to detect the touch operation, thereby controlling to increase the operation-receiving sensitivity of the touch operation detection unit.

11. An apparatus according to claim 1, wherein the touch operation detection unit is a touch operation detection unit of an electric capacity type, and
the control unit adjusts a threshold of a capacity to detect the touch operation, thereby controlling to increase the operation-receiving sensitivity of the touch operation detection unit.

12. An image pickup apparatus comprising:
an image pickup unit arranged to pick up a moving image;
a recording control unit configured to control to record the moving image picked up by the image pickup unit;
a display unit provided on a variable angle monitor unit rotatably connected, via a connection unit, to a main body unit including the image pickup unit;
a touch operation detection unit configured to detect a touch operation on the display unit; and
a display control unit configured to control, in accordance with a start of moving image recording by the image pickup unit and the recording control unit, to move a display position of a display item displayed on the display unit to receive the touch operation, to a side closer to the connection unit than before the start of the moving image recording.

13. A control method of an image pickup apparatus including an image pickup unit arranged to pick up a moving image, a recording control unit configured to control to record the moving image picked up by the image pickup unit, and a touch operation detection unit configured to detect a touch operation, the method comprising:
while moving image recording is being executed by the image pickup unit and the recording control unit, in accordance with a start of the moving image recording by the image pickup unit and the recording control unit, increasing an operation-receiving sensitivity of the touch operation detection unit as compared to while the moving image recording is not being executed.

14. A non-transitory computer-readable storage medium storing a program for causing a computer to execute a control method according to claim 13.

15. A control method of an image pickup apparatus including a display unit provided on a variable angle monitor unit rotatably connected, via a connection unit, to a main body unit including an image pickup unit, and a recording control unit configured to control to record a moving image picked up by the image pickup unit, the control method comprising:
while moving image recording is being executed by the image pickup unit and the recording control unit, moving a display item displayed on the display unit to receive a touch operation, to a side closer to the connection unit than before a start of the moving image recording as compared to while the moving image recording is not being performed.

16. A non-transitory computer-readable storage medium storing a program for causing a computer to execute a control method according to claim 15.

17. An image pickup apparatus comprising:
an image pickup unit arranged to pick up a moving image;
a recording control unit configured to control to record the moving image picked up by the image pickup unit;
a display control unit configured to control display of a display unit;
a touch operation detection unit configured to detect a touch operation on the display unit; and
a control unit configured to control to increase an operation-receiving sensitivity of the touch operation detection unit in moving image recording by the image pickup unit and the recording control unit as compared to in a state other than the moving image recording,
wherein the display control unit controls to display, on the display unit, a display item to receive the touch operation in different display formats before and after the control unit increases the operation-receiving sensitivity.

18. An image pickup apparatus comprising:
- an image pickup unit arranged to pick up a moving image;
- a recording control unit configured to control to record the moving image picked up by the image pickup unit;
- a display control unit configured to control display of a display unit;
- a touch operation detection unit configured to detect a touch operation on the display unit; and
- a control unit configured to control to increase an operation-receiving sensitivity of the touch operation detection unit in moving image recording by the image pickup unit and the recording control unit as compared to in a state other than the moving image recording,
- wherein the display unit is provided on a variable angle monitor unit rotatably connected, via a connection unit, to a main body unit including the image pickup unit, and
- the display control unit controls to perform, in accordance with the start of the moving image recording, moving processing of moving a display position of a display item displayed on the display unit to receive the touch operation to a side closer to the connection unit than before the start of the moving image recording.

19. An image pickup apparatus comprising:
- an image pickup unit arranged to pick up a moving image;
- a recording control unit configured to control to record the moving image picked up by the image pickup unit;
- a touch operation detection unit configured to detect a touch operation; and
- a control unit configured to control to increase an operation-receiving sensitivity of the touch operation detection unit in moving image recording by the image pickup unit and the recording control unit as compared to in a state other than the moving image recording,
- wherein the touch operation detection unit is a touch operation detection unit of a resistance film type, and
- the control unit lowers a threshold of a voltage to detect the touch operation, thereby controlling to increase the operation-receiving sensitivity of the touch operation detection unit.

20. An apparatus according to claim 19, wherein the control unit controls to increase the operation-receiving sensitivity of the touch operation detection unit in accordance with a start of the moving image recording by the image pickup unit and the recording control unit.

21. An apparatus according to claim 19, wherein the touch operation detection unit comprises a touch panel configured to detect the touch operation on a display unit, and
the apparatus further comprises a display control unit configured to control display of the display unit.

22. An apparatus according to claim 21, wherein the display control unit controls to display, on the display unit, a display item to receive the touch operation in different display formats before and after the control unit increases the operation-receiving sensitivity.

23. An apparatus according to claim 22, wherein the control unit controls to increase the operation-receiving sensitivity for, out of a first display item and a second display item displayed on the display unit to receive the touch operation during the moving image recording, the first display item and not to increase the operation-receiving sensitivity for the second display item.

24. An apparatus according to claim 23, wherein the second display item comprises a display item to receive a stop instruction of the moving image recording.

25. An apparatus according to claim 24, wherein the control unit increases the operation-receiving sensitivity of the touch operation detection unit, and widens an operation-receiving range of the first display item displayed on the display unit to receive the touch operation.

26. An apparatus according to claim 24, wherein the control unit increases the operation-receiving sensitivity of the touch operation detection unit, and narrows a display range of the first display item displayed on the display unit to receive the touch operation, without changing an operation-receiving range of the first display item.

27. An apparatus according to claim 21, wherein the display unit is provided on a variable angle monitor unit rotatably connected, via a connection unit, to a main body unit including the image pickup unit, and
the display control unit controls to perform, in accordance with the start of the moving image recording, moving processing of moving a display position of a display item displayed on the display unit to receive the touch operation to a side closer to the connection unit than before the start of the moving image recording.

28. An apparatus according to claim 27, wherein the display control unit performs the moving processing in a case where the variable angle monitor unit is open with respect to the main body unit, and does not perform the moving processing in a case where the variable angle monitor unit is closed with respect to the main body unit.

29. An image pickup apparatus comprising:
- an image pickup unit arranged to pick up a moving image;
- a recording control unit configured to control to record the moving image picked up by the image pickup unit;
- a touch operation detection unit configured to detect a touch operation; and
- a control unit configured to control to increase an operation-receiving sensitivity of the touch operation detection unit in moving image recording by the image pickup unit and the recording control unit as compared to in a state other than the moving image recording,
- wherein the touch operation detection unit is a touch operation detection unit of an electric capacity type, and
- the control unit adjusts a threshold of a capacity to detect the touch operation, thereby controlling to increase the operation-receiving sensitivity of the touch operation detection unit.

30. An apparatus according to claim 29, wherein the control unit controls to increase the operation-receiving sensitivity of the touch operation detection unit in accordance with a start of the moving image recording by the image pickup unit and the recording control unit.

31. An apparatus according to claim 29, wherein the touch operation detection unit comprises a touch panel configured to detect the touch operation on a display unit, and
the apparatus further comprises a display control unit configured to control display of the display unit.

32. An apparatus according to claim 31, wherein the display control unit controls to display, on the display unit, a display item to receive the touch operation in different display formats before and after the control unit increases the operation-receiving sensitivity.

33. An apparatus according to claim 32, wherein the control unit controls to increase the operation-receiving sensitivity for, out of a first display item and a second display item displayed on the display unit to receive the touch operation during the moving image recording, the first display item and not to increase the operation-receiving sensitivity for the second display item.

34. An apparatus according to claim 33, wherein the second display item comprises a display item to receive a stop instruction of the moving image recording.

35. An apparatus according to claim 34, wherein the control unit increases the operation-receiving sensitivity of the touch operation detection unit, and widens an operation-receiving range of the first display item displayed on the display unit to receive the touch operation.

36. An apparatus according to claim 34, wherein the control unit increases the operation-receiving sensitivity of the touch operation detection unit, and narrows a display range of the first display item displayed on the display unit to receive the touch operation, without changing an operation-receiving range of the first display item.

37. An apparatus according to claim 31, wherein the display unit is provided on a variable angle monitor unit rotatably connected, via a connection unit, to a main body unit including the image pickup unit, and the display control unit controls to perform, in accordance with the start of the moving image recording, moving processing of moving a display position of a display item displayed on the display unit to receive the touch operation to a side closer to the connection unit than before the start of the moving image recording.

38. An apparatus according to claim 37, wherein the display control unit performs the moving processing in a case where the variable angle monitor unit is open with respect to the main body unit, and does not perform the moving processing in a case where the variable angle monitor unit is closed with respect to the main body unit.

39. A control method of an image pickup apparatus including an image pickup unit arranged to pick up a moving image, a recording control unit configured to control to record the moving image picked up by the image pickup unit, and a touch operation detection unit configured to detect a touch operation on a display unit, the method comprising:

while moving image recording is being executed by the image pickup unit and the recording control unit, increasing an operation-receiving sensitivity of the touch operation detection unit as compared to while the moving image recording is not being executed, and displaying a display item to receive the touch operation on the display unit in different display formats before and after increasing the operation-receiving sensitivity.

40. A non-transitory computer-readable storage medium storing a program for causing a computer to execute a control method according to claim 39.

41. A control method of an image pickup apparatus including an image pickup unit arranged to pick up a moving image, a recording control unit configured to control to record the moving image picked up by the image pickup unit, and a touch operation detection unit configured to detect a touch operation on a display unit, and the display unit provided on a variable angle monitor unit rotatably connected, via a connection unit, to a main body unit including the image pickup unit, the method comprising:

while moving image recording is being executed by the image pickup unit and the recording control unit, increasing an operation-receiving sensitivity of the touch operation detection unit as compared to while the moving image recording is not being executed, and moving a display position of a display item displayed on the display unit to receive the touch operation to a side closer to the connection unit than before the start of the moving mage image recording in accordance with the start of the moving image recording.

42. A non-transitory computer-readable storage medium storing a program for causing a computer to execute a control method according to claim 41.

43. A control method of an image pickup apparatus including an image pickup unit arranged to pick up a moving image, a recording control unit configured to control to record the moving image picked up by the image pickup unit, and a touch operation detection unit configured to detect a touch operation, wherein the touch operation detection unit is a touch operation detection unit of a resistance film type, the method comprising:

while moving image recording is being executed by the image pickup unit and the recording control unit, lowering a threshold of a voltage to detect the touch operation, thereby increasing an operation-receiving sensitivity of the touch operation detection unit as compared to while the moving image recording is not being executed.

44. A non-transitory computer-readable storage medium storing a program for causing a computer to execute a control method according to claim 43.

45. A control method of an image pickup apparatus including an image pickup unit arranged to pick up a moving image, a recording control unit configured to control to record the moving image picked up by the image pickup unit, and a touch operation detection unit configured to detect a touch operation, wherein the touch operation detection unit is a touch operation detection unit of an electric capacity type, the method comprising:

while moving image recording is being executed by the image pickup unit and the recording control unit, adjusting a threshold of a capacity to detect the touch operation, thereby increasing an operation-receiving sensitivity of the touch operation detection unit as compared to while the moving image recording is not being executed.

46. A non-transitory computer-readable storage medium storing a program for causing a computer to execute a control method according to claim 45.

* * * * *